United States Patent [19]

Yamamoto

[11] Patent Number: 4,654,874
[45] Date of Patent: Mar. 31, 1987

[54] ELECTRONIC DEVICE WITH A FINGER ACTIVATING DATA INPUT FUNCTION

[75] Inventor: Haruo Yamamoto, Tokyo, Japan

[73] Assignee: Casio Computer Co., Ltd., Tokyo, Japan

[21] Appl. No.: 658,496

[22] Filed: Oct. 9, 1984

[30] Foreign Application Priority Data

Oct. 25, 1983 [JP] Japan .................. 58-200449

[51] Int. Cl.⁴ .............................................. G06K 9/00
[52] U.S. Cl. ................................................... 382/13
[58] Field of Search ........................ 382/13, 3, 11, 24

[56] References Cited

U.S. PATENT DOCUMENTS 4,578,811  3/1986  Inagaki ................................ 382/13

FOREIGN PATENT DOCUMENTS 3029241  9/1982  Fed. Rep. of Germany .
2124809  2/1984  United Kingdom .
2127196  4/1984  United Kingdom .

Primary Examiner—Anthony V. Ciarlante
Attorney, Agent, or Firm—Frishauf, Holtz, Goodman & Woodward

[57]  ABSTRACT

An electronic device enters pattern data upon activating a matrix of keys with a finger. A comparing section compares measured data in a counter (register C) for measuring the time interval from the release of a key till the depression of the next key, with a value set in a memory (register E) for storing a predetermined externally set time interval. When the measured data in the counter reaches the set value in the memory, a character recognizing section performs character recognition on the entered data.

9 Claims, 5 Drawing Figures

FIG. 4
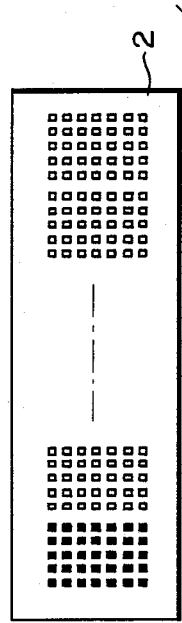
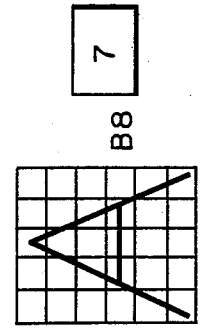
FIG. 5
COMMAND KEY → LOAD VALUE CORRESPONDING TO SET DATA INTO REGISTER E (S18) → END

ELECTRONIC DEVICE WITH A FINGER ACTIVATING DATA INPUT FUNCTION

BACKGROUND OF THE INVENTION

The present invention relates to improvements in an electronic device of the type in which pattern data is input with a finger activation.

Electronic devices are known in which pattern data such as characters is input by tracing a character on a key board with a finger, for example. In the electronic device, characters must electronically be distinguished one from another. For the character distinction, the electronic device detects a time interval from the instant that the final key is released after a finger activation of a character is completed, until the next key is depressed. Upon detection of the time interval, the electronic device recognizes the character, and displays it as the input character. It is a common practice that the time interval is set at a fixed time length, as disclosed in Japanese Patent Kokai No. 50-152621.

Generally, the finger activating speed is different for each operator because of his peculiar way of writing. Accordingly, some operators start writing the next character before the fixed time interval terminates. Other operators do the same after it is terminated. This frequently causes the electronic device to mistakenly recognize the character as input.

SUMMARY OF THE INVENTION

Accordingly, an object of the present invention is to provide an electronic device with a finger activating data input function in which the time interval between characters that are input can appropriately be set according to the finger activating speed of an operator. An advantage of the present invention is the elimination of erroneous character recognition and improvement of data input efficiency.

According to the present invention, there is provided an electronic device for entering pattern data by activating a matrix of keys with a finger, comprising pattern data input means having a matrix array of keys, time interval measuring means connected to the pattern data input means, for measuring the time interval from the release of a key in the pattern data input means till the depression of the next different key therein, memory means for storing a value corresponding to the time interval between characters by a keying operation, comparing means connected to the interval measuring means and the memory means, for comparing the counted data of the time interval measuring means with the value corresponding to the time interval stored in the memory means, means for performing character recognition when the comparing means detects that the counted data of the time interval measuring means reaches the value stored in the memory means, control means connected to the pattern data input means, the time interval meansuring means, the memory means, the comparing means, and the character recognition means, for controlling the operation among and of those means, and display means for displaying the recognized character after the character is recognized by the character recognition means. With such an arrangement, the time interval between characters can be adjusted for any operator without regard to his finger activating speed.

BRIEF DESCRIPTION OF THE DRAWINGS

Other objects, features and advantages of the present invention will be apparent from the following description when taken in conjunction with the accompanying drawings, in which:

FIG. 4 shows a memory state in a register B and a display state in a display section 2 in FIG. 2; and FIG. 5 is a flow chart of a procedure for changing the time interval between characters in the circuit arrangement shown in FIG. 2.

DETAILED DESCRIPTION OF THE PREFERRED EMBODIMENT

Figure 1:
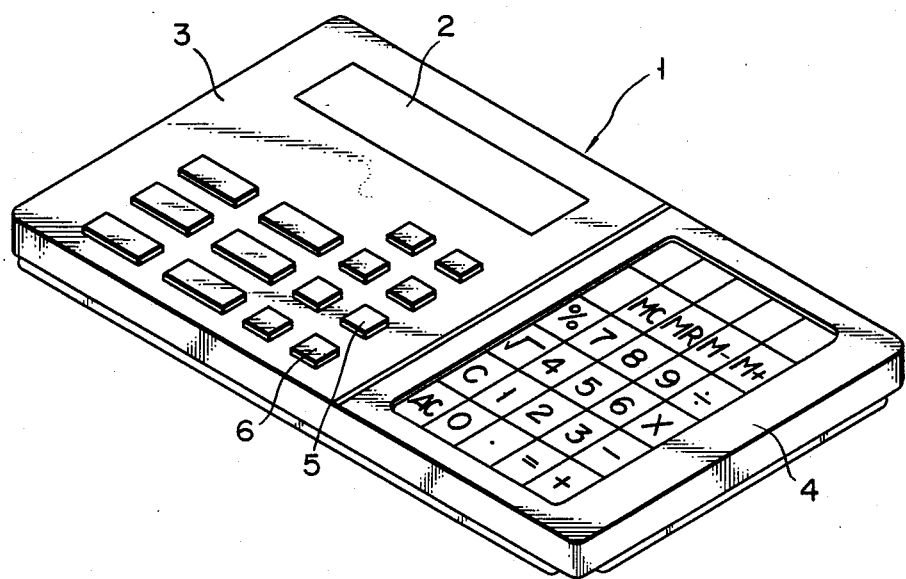
FIG. 1 shows the outside of a calculator incorporating an electronic device which is an embodiment of the present invention.

Reference is made to FIG. 1 illustrating an external view of a hand-held electronic calculator incorporating the present invention. In the figure, a case 1 of the calculator has a display section 2 with a key section 3 on the left half and a finger activating input section 4 on the right half. The display section 2 is structured with liquid crystal display elements with 5×7 dot matrix arrays. The display section 2 thus structured is capable of displaying numerals 0-9, alphabetic letters A-Z, arithmetic signs +, −, × and ÷, and the like. In the finger activating input section 4, ten keys, function keys, and the like are arrayed in a matrix fashion to allow pattern data to be input by a finger activation. The key section 3 includes a command key 5, an execution key 6, and an ON/OFF key as a power switch, an AC (all clear) key, a C (clear) key, a MEMO key for electronic memory, "←" and "→" keys for reading out the data in the electronic memory, a mode key for selecting a mode 1 and a mode 2, and the like. In mode 1, the calculator operates in a normal calculation mode. In this mode, the respective keys function normally. In mode 2, the electronic device operates for the matrix input, and the finger activating input section 4 is effective for allowing pattern data of such characters to be input by a finger activation. For pattern data input, this mode is set up, and matrix arrayed keys of 5×6 are activated, with an operator's finger, for example, along the shape of a desired character or a sign of those as mentioned above, 0-9, A-Z, +, −, × and ÷. The traced character is displayed in the display section 2. Then, the MEMO key is pushed to store the pattern data as input and the character data is stored in the electronic memory. Further, if "5+2=" is input with a finger activation in a similar way, such can be calculated.

Figure 2:
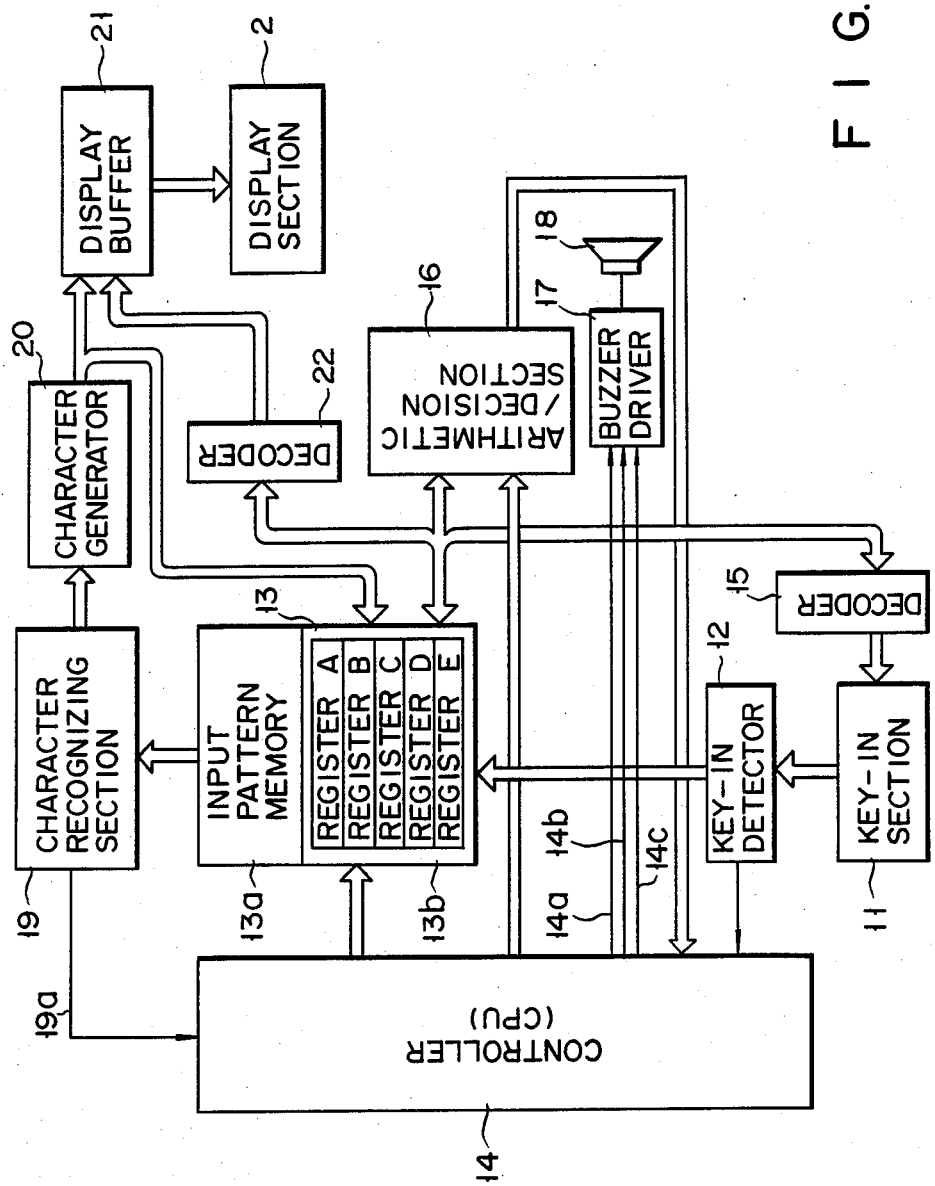
FIG. 2 illustrates in block diagram an electrical arrangement of the electronic device assembled into the calculator of FIG. 1.

An electrical arrangement of the electronic device housed in the case 1 will be described referring to FIG. 2. FIG. 2 shows data input and character recognition functions, and hence does not illustrate circuit blocks concerning the arithmetic function, electronic memory function, and the like. In FIG. 2, a key-in section 11 responds to the key-in operation of the key section 3 and the finger activating input section 4, and generates keyed-in data. Specifically, in a calculation mode or mode 1, the key-in section 11 generates codes relating to the normal function of the keys. In a matrix input mode or mode 2, it generates coordinate data resulting from the key-in operation in the finger activating input section 4. It is evident that the normal key codes as keyed in mode 1 may be converted into the coordiante data. The coordinate data from the key-in section 11 is transferred through a key-in detector 12 to an input pattern memory 13a in a memory section 13. Upon receipt of the data, the key-in detector 12, when detecting presence of key-in, produces a key-in signal for transfer to a controller (CPU) 14. The memory section 13 is made up of the input pattern memory 13a for storing finger activating data as keyed in, and a register section 13b containing registers A–E. The read/write operation of the memory section 13 is controlled by the controller 14. The registers A–C in the register section 13b are provided for displaying the lapse of time at the time of data input at each digit of the display section 2. The register A stores digit data to indicate at what digit of the display section 2 the time lapse data or the input data is displayed. The loading of the data into the register is made with the designation of digit in a data processing step. For example, when the data in the register A is "1", the input data is stored in the first digit in the display section 2. When it is "8", it is stored in the 8th digit. If necessary, the data of the register A can be used for displaying a cursor, although it is not provided in this embodiment. The register B stores data to indicate what number of dot lines in the 5×7 dot array and at the digit as specified by the register A, is to be lighted. The loading of the data is made when it is detected that the key-in is present in the key-sampling step. If B=7, all of the dots of seven lines in the matrix are lighted. If B=1, the dots on the lower most line alone are lighted. The register C serves as a counter for controlling the lighting time of one dot line. The register D serves as a counter for key sampling. The contents of the register D are transferred to a decoder 15 where it is decoded into a key sampling signal. The key sampling signal is then applied to the key-in section 11. The register E is for storing the interval between characters from when the operator starts writing one character until he writes another character, and for storing this interval, which is divided into nine stages. Selection of the time interval from the nine is externally performed according to the finger activating speed of the operator. The data stored in the registers A to E in the register section 13b are read out into an arithmetic/decision section 16. A predetermined numeric code, for example, a constant number "7" is input from the controller 14 to the arithmetic/decision section 16. The arithmetic/decision section 16 arithmetically operates on the data and the constant number, and checks, on the basis of the operation result, as to whether data is present or not and a carry is present or not. And it sends the check results to the controller 14. The controller 14 excutes a predetermined control operation according to the data in the controller 14, and from the key-in detector 12 and the arithmetic/decision section 16. The controller 14 applies a drive signal to a buzzer driver 17, through signal lines 14a–14c. The buzzer driver 17 responds to a drive signal coming through one of the signal lines 14a to 14c from the controller 14, and drives a speaker 18 to cause it to sound with one of three different frequencies. The keyed in data stored in the input pattern memory 13a is read out therefrom and transferred to a character recognizing section 19. The data is subjected to character recognition in the character recognizing section 19. The result of the character recognition is then applied to a character generator 20. The character generator 20 generates character data on the basis of the character recognition result. The character data is temporarily stored in a display buffer 21, and is displayed by the display section 2. When the character recognizing section 19 fails to make the character recognition, it sends a recognition failure signal to the controller 14, through a line 19a. Further, data representing the number of dot lines, which is stored in the register B, is decoded by the decoder 22, and the decoded data is applied to the display buffer 21. The data representing the number of dot lines is used for indicating the lapse of time from the instant that the character is finger activated.

Figure 3:
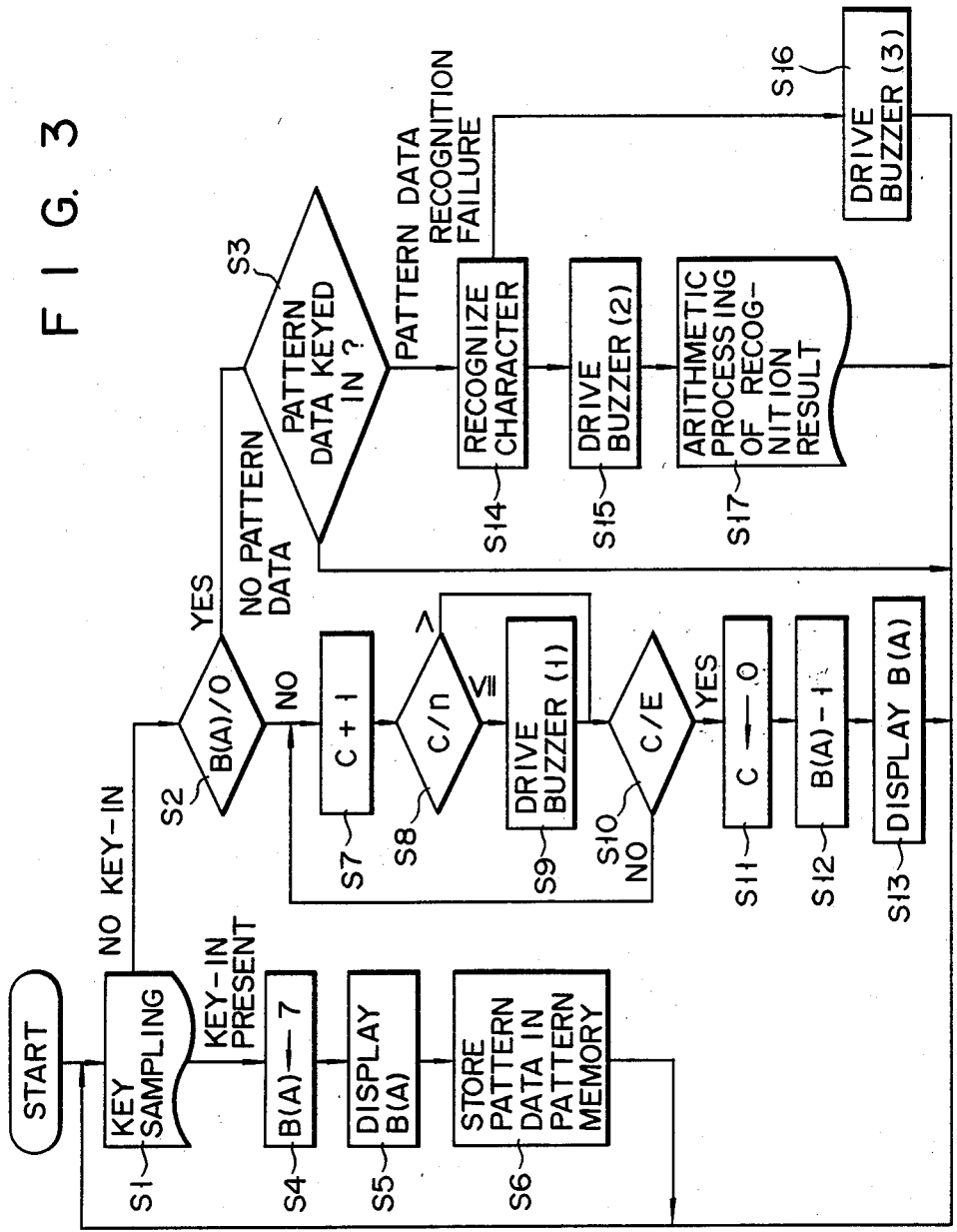
FIG. 3 is a flow chart of the operation of the electrical arrangement shown in FIG. 2.

The operation of the calculator thus far described will be given referring to a flow chart shown in FIG. 3. The register D in the register section 13b is constantly counted up at predetermined timings and its contents are decoded by the decoder 15. The decoded contents are input as a key sampling signal to the key-in section 11. The key-in detector 12 checks whether or not a key-in signal is present or not, and sends the check result to the controller 14. The above process of key sampling and checking of presence or absence of key-in is performed in a step S1, as shown in FIG. 3. If the key-in is absent, the next step S2 is executed. In this step, it is checked whether the contents B(A) of the register B at a digit of the display section 2, which are stored in the register A, indicate "0" or not. If B(A)=0, a step S3 is executed to check whether the keyed-in pattern data immediately before sampling is present or not. If the pattern data is not present immediately before the key sampling, the controller 14 returns to the step S1 in its program execution. In steps S1 to S3, the key sampling is performed, as mentioned above. In other words, when the keying-in operation is not yet performed, the controller 14 is in a key-in wait mode to cyclically execute the steps S1–S3. In this mode, if an operator starts the writing of an alphabetic letter A, as shown in FIG. 4, the key-in operation by the finger activating is detected in the step S1. Upon detection of the key-in, the flow advances to a step S4. In this step, the controller 14 loads into the register B data of, for example, "7" representing the number of dot lines to be energized at the digit, e.g. the 8th digit (most significant digit), of the display section 2 as specified by the register A. Following this step, a step S5 is executed. In this step, the data of "7" is read out of the register B, and is displayed in the display section 2 after properly being processed by the decoder and the display buffer 21. If B(A)=7, all of the dots of seven dot lines at the 8th digit in the display section 2 are driven, as shown in FIG. 4. Then, the flow advances to step S6 where the character A is loaded into the input pattern memory 13a. Following this step, step S1 is executed again. During a period that writing is performed, viz. that the key depression of one stroke is performed, the data processing through the steps S1, and S4–S6 is repeated. After the one stroke key-in operation is completed, the flow advances from step S1 to step S2. In this step, it is checked whether the contents B(A) of the register B, which, in this case, is the data at the 8th digit of the display section 2 stored in the register A, is "0" or not. At this time, the register B stores data "7". Accordingly, the step S2 provides NO. Then, the flow goes to step S7. In this step, the register C for dot energizing time control is incremented by 1. Then, step S8 is executed. In this step, the arithmetic/decision section 16 compares the contents of the register C with a value n representing a buzzer drive time, which is a constant as input from the controller 14. If C≦n, step S9 is executed. In this step, the controller 14 sends a drive signal through the signal line 14a to the buzzer driver 17. Every time dots of one dot line at a predetermined digit of the display section 2 are energized, the buzzer driver 17 drives the speaker 18 at frequency f1. Then, the controller 14 proceeds to step S10 where it is checked whether or not the value set in the register E reaches the value m. The set value m selected; 42 ms for "1" (input value), 52 ms for "2", ... 115 ms for "9". Accordingly, actual interval times between characters are: 42×7 ms for 1, 52×7 ms for 2, ... 115×7 ms for 9. If the value in the register C exceeds n, but is below m in the register E, the controller 14 returns to step S7. Subsequently, the processing from steps S7–S10 is repeated till C=m. When C>n, the controller 14 jumps from step S8 to step S10. At this time, C is still smaller than m (C<m). Accordingly, the controller 14 returns to step S7 where "C+1" is carried out. Then, the flow advances to step S10 through step S8. In this time, if C=m, step S10 provides YES, and hence S11 is executed. In the step S11, the register C is cleared. In the succeeding step S12, B(A)−1 is carried out, more exactly, 7−1=6. The data, 6, of the register B is sent through the decoder 22 to the display buffer 21, and the display of B(A) is performed, as in step S13. The dots of the lower six dot lines at the 8th digit of the display section 2 are energized to light, as shown in FIG. 4. Then, the flow returns to step S1 to execute the key sampling. At this time, if no key-in operation is performed, the processing is performed as in the above manner. At the actuated digit of the display section 2, the energized dot lines are reduced line by line, as shown in FIG. 4. The buzzer is sounded for every reduction of the energized dot line. Then, if the next key is depressed before the contents B(A) of the register B becomes 0, the flow advances from step S1 to step S4, and to execute the data processing as already mentioned, and "7" is set again in the register B. In this way, if the next key is not operated during a fixed time period, i.e. till the B(A) of the register B is "0", the controller 14 judges that the data of one character terminates, and the flow advances from step S2 to step S3. In step S3, it is checked whether the keyed-in data before the time interval terminates is present or not. When the character A is handwritten, as in the above case, the pattern data is stored in the input pattern memory 13a. Accordingly, step S14 is executed. In this step, the pattern data held in the input pattern memory 13a is sent to the character recognizing section 19 to make a character recognition. The result of the character recognition is applied to the character generator 20 which in turn converts it into corresponding character data. The character data is then transferred to the display buffer 21 to provide a display of the character A at the specified digit of the display section 2 as shown in FIG. 4. After character recognition, the flow advances to step S15. In this step, the controller 14 sends a buzzer drive signal to the buzzer driver 17, through the signal line 17b. In turn, the buzzer driver 17 drives the speaker 18 to cause it to sound at a frequency f2 different from that of the buzzer sound representing the lapse of time, which is produced every deenergization of one dot line as mentioned above. If the character recognizing section 19 fails to make the character recognition, step S13 is executed. In this step, the speaker 18 is driven to sound at a frequeny indicating failure of the character recognition. Then, the flow goes to step S17. In this step, the result of the character recognition from the character recognizing section 19 is input in the arbitrary register in the register section 13b through the character generator 20. Then, the result data is input in the arithmetic/decision section 16 for arithmetical processing. Subsequently, the keyed-in data are subjected to similar processings, and are displayed in the display section 2 in succession, while at the same time being transferred to the arithmetic/logic unit (not shown).

For changing the time interval between characters, a desired numeral of 1–9 is input in the finger activating input section 4. An operator confirms that the entered numeral is correctly entered, while seeing the numeral displayed by the display section 2. Then, he presses the execution key to input it to the arithmetic/decision section 16, via the register E in the register section 13b. The numerical data is converted into a corresponding code. The coded data such as numeral "1" representing 42 ms and "2", 52 ms is then loaded into the register E. See step S18. Subsequentiy, the finger activating input is performed in a similar way.

While in the above-mentioned embodiment up to nine time intervals are set, the number of time intervals to be set may be increased or decreased, if necessary. The time interval may selectively be set with the number of depressions of a specified key. In the above-mentioned embodiment, 1/7 of the time length of the interval is set in the register E. It is evident that the time length of the interval may directly be set in the register E.

What is claimed is:

1. An electronic device for entering pattern data by activating a matrix of keys with a finger, comprising:

pattern data input means including a matrix array of keys;

means connected to said pattern data input means, for measuring the time interval from the release of a key in the pattern data input means till the depression of a next different key therein;

memory means for storing a preset value corresponding to a time interval between characters, including means for enabling a user to enter said preset value in said memory means by a keying-in operation on said input means;

comparing means connected to said interval measuring means and said memory means, for comparing counted data of said time interval measuring means with the preset value corresponding to the time interval stored in said memory means;

means for performing character recognition when said comparing means detects that the counted data of said time interval measuring means reaches said preset value stored in said memory means;

control means connected to said pattern data input means, said time interval measuring means, said memory means, said comparing means, and said character recognition means, for controlling the operation among and of those means; and display means for displaying the recognized character after the character is recognized by said character recognition means.

2. The electronic device according to claim 1, in which said character recognition means produces a recognition failure signal when the input data is not coincident with the stored pattern data.

3. The electronic device according to claim 1, in which said pattern data input means includes means for selecting one of a calculation mode and a finger activating mode.

4. The electronic device according to claim 1, further including sounding means connected to said control means and for sounding at different frequencies.

5. The electronic device according to claim 4, in which said sounding means sounds every time said time interval measuring means updates the set value.

6. The electronic device according to claim 4, in which said sounding means sounds when said time interval measuring means counts a predetermined time interval and a character recognition is finished.

7. The electronic device according to claim 4, in which, when said character recognition means generates a recognition failure signal, said sounding means responds to a sounding command from said control means which receives said recognition failure signal, and sounds to tell the failure of character recognition.

8. The electronic device according to claim 1, in which said memory means stores, as a value corresponding to the time interval between characters, a value converted into corresponding code data after the data stored by the keying-in operation is operated.

9. The electronic device according to claim 1, in which said memory means stores the time interval between characters as a value corresponding to deenergization of a plurality of dot lines provided at a digit in said display means.

* * * * *

UNITED STATES PATENT AND TRADEMARK OFFICE
CERTIFICATE OF CORRECTION

PATENT NO.   : 4,654,874
DATED        : March 31, 1987
INVENTOR(S)  : YAMAMOTO

It is certified that error appears in the above-identified patent and that said Letters Patent is hereby corrected as shown below:

Title page, under "References Cited", "Foreign Patent Documents" list:

| DOCUMENT NO. | DATE | COUNTRY |
|---|---|---|
| 50,152,621 | 12/1975 | JAPAN |

Signed and Sealed this

Twenty-sixth Day of January, 1988

Attest:

DONALD J. QUIGG

Attesting Officer

Commissioner of Patents and Trademarks